United States Patent
Kelly

[11] Patent Number: 5,406,415
[45] Date of Patent: Apr. 11, 1995

[54] IMAGING SYSTEM FOR A HEAD-MOUNTED DISPLAY

[76] Inventor: Shawn L. Kelly, 6423 Hollyhock Trail, Brighton, Mich. 48116

[21] Appl. No.: 948,662

[22] Filed: Sep. 22, 1992

[51] Int. Cl.⁶ .................... G02B 27/14; G02B 17/00; G09G 3/02
[52] U.S. Cl. ................... 359/633; 359/364; 359/631; 345/7
[58] Field of Search ............... 359/13–14, 359/227, 229, 362–366, 503–505, 601, 602, 608, 609, 614, 618, 630–634, 885, 888, 891–894, 900, 559, 560, 561, 564, 637; 340/705, 980

[56] References Cited

U.S. PATENT DOCUMENTS

| | | | |
|---|---|---|---|
| 3,787,109 | 1/1974 | Vizenor | 359/631 |
| 3,870,405 | 3/1975 | Hedges | 359/631 |
| 3,909,523 | 9/1975 | Bartucci | 358/60 |
| 3,923,370 | 12/1975 | Mostrom | 359/630 |
| 3,940,204 | 2/1976 | Withrington | 359/618 |
| 4,028,725 | 6/1977 | Lewis | 358/103 |
| 4,437,113 | 3/1984 | Lee et al. | 358/93 |
| 4,606,606 | 8/1986 | Freeman | 359/482 |
| 4,636,866 | 1/1987 | Hattori | 358/236 |
| 4,695,129 | 9/1987 | Faessen et al. | 385/119 |
| 4,755,023 | 7/1988 | Evans et al. | 340/705 |
| 4,757,714 | 7/1988 | Purdy et al. | 73/597 |
| 4,786,966 | 11/1988 | Hanson et al. | 358/108 |
| 4,859,030 | 8/1989 | Rotler | 359/633 |
| 4,968,123 | 11/1990 | Fournier, Jr. et al. | 359/630 |
| 5,003,300 | 3/1991 | Wells | 340/705 |
| 5,006,072 | 4/1991 | Lehovsky et al. | 434/61 |
| 5,035,474 | 7/1991 | Moss et al. | 359/13 |
| 5,130,794 | 7/1992 | Ritchey | 358/87 |
| 5,134,521 | 7/1992 | Lacroix et al. | 359/633 |

Primary Examiner—Loha Ben
Assistant Examiner—Thong Nguyen
Attorney, Agent, or Firm—Lyman R. Lyon

[57] ABSTRACT

An imaging system (10) for a Head-Mounted Display (HMD) comprises a projection screen (22) integrally formed with a headgear structure of the HMD. An image source is projected onto the projection screen (22) as an intermediate image. An optical sub-system (24), such as a lens, re-images the intermediate image to form a virtual image as viewed by a user's eye (26). The present invention provides improved imaging while reducing the weight and manufacturing cost of the HMD. In accordance with another aspect of the present invention, an optical spatial filter (28) is utilized in an HMD imaging system to remove unwanted image artifacts, and increase the depth of focus of an intermediate projected image.

8 Claims, 1 Drawing Sheet

IMAGING SYSTEM FOR A HEAD-MOUNTED DISPLAY

BACKGROUND OF THE INVENTION

The present invention relates generally to head-mounted displays, and more particularly to an improved imaging system for a head-mounted display which weighs less, costs less, displays higher image quality, and exhibits a wider field of view than prior art systems.

A Head-Mounted Display (HMD) is an apparatus worn as a helmet or goggle which presents electronically generated or relayed imagery to the user. In some applications such imagery is optically combined with a direct view of the outside world. In most applications however, the electronic imagery is the only scene presented to the user, creating a virtual reality which the user can scan by head movement. Such virtual reality is useful in many applications such as video games, computer aided design and the remote operation of robots.

All HMD configurations begin with an Electronic Display Device (EDD) such as a Cathode Ray Tube (CRT), a Liquid Crystal (LC) panel or a Light Emitting Diode (LED) array. The EDD is viewed by the eye through an imaging system which produces a virtual image of the EDD apparently focused at a comfortable viewing distance.

The preferred HMD exhibits several important characteristics. First, the HMD should be capable of displaying a wide Field-of-View (FOV) so that the user enjoys the perception of being totally immersed in the virtual reality while also benefiting from the presence of peripheral cues. Second, the HMD should be lightweight so that the user is not overly encumbered—especially during head movement. Third, the HMD must be practically constructed to minimize cost and thereby accommodate the greatest number of applications. Fourth, the HMD should provide images which appear real.

Known HMD imaging systems use a combination of lenses and/or mirrors to directly relay the EDD image to the eye. To achieve an acceptable image quality over a large FOV, such combinations require large compound optics which are expensive, require large amounts of space, and are thick and therefore heavy. Known HMD imaging systems also image the artificial picture element (pixel) and/or line structure of the image produced by the EDD, creating an artificial appearance and therefore reducing realism in the image seen by the eye.

SUMMARY OF THE INVENTION

It is therefore an object of the present invention to provide an improved imaging system for a Head-Mounted Display.

It is a further object of the present invention to provide a reduced-weight imaging system for a Head-Mounted Display.

It is another object of the present invention to provide a low cost, practically fabricated imaging system for a Head-Mounted Display.

It is yet another object of the present invention to provide an imaging system for a Head-Mounted Display which removes unwanted picture element and line structures from the viewed image.

In accordance with the present invention, an imaging system for a head-mounted display comprises a means for projecting a source image, a projection screen for displaying the projected source image, and a means for re-imaging the projected image displayed by the projection screen as a virtual image for viewing by a person using the head-mounted display. The head-mounted display comprises a headgear structure to be worn on the head of the viewer. The projection screen is integrally formed as part of the headgear structure.

In accordance with a second aspect of the present invention, an imaging system for a head-mounted display comprises a means for projecting a source image onto an image surface to form an intermediate image, a means for re-imaging the intermediate image as a virtual image for viewing by a person using the head-mounted display, and an optical spatial filter for removing unwanted image artifacts from the virtual image.

The present invention will be more fully understood upon reading the following detailed description of the preferred embodiment in conjunction with the accompanying drawings.

DETAILED DESCRIPTION OF THE PREFERRED EMBODIMENTS OF THE INVENTION

Figure 1:
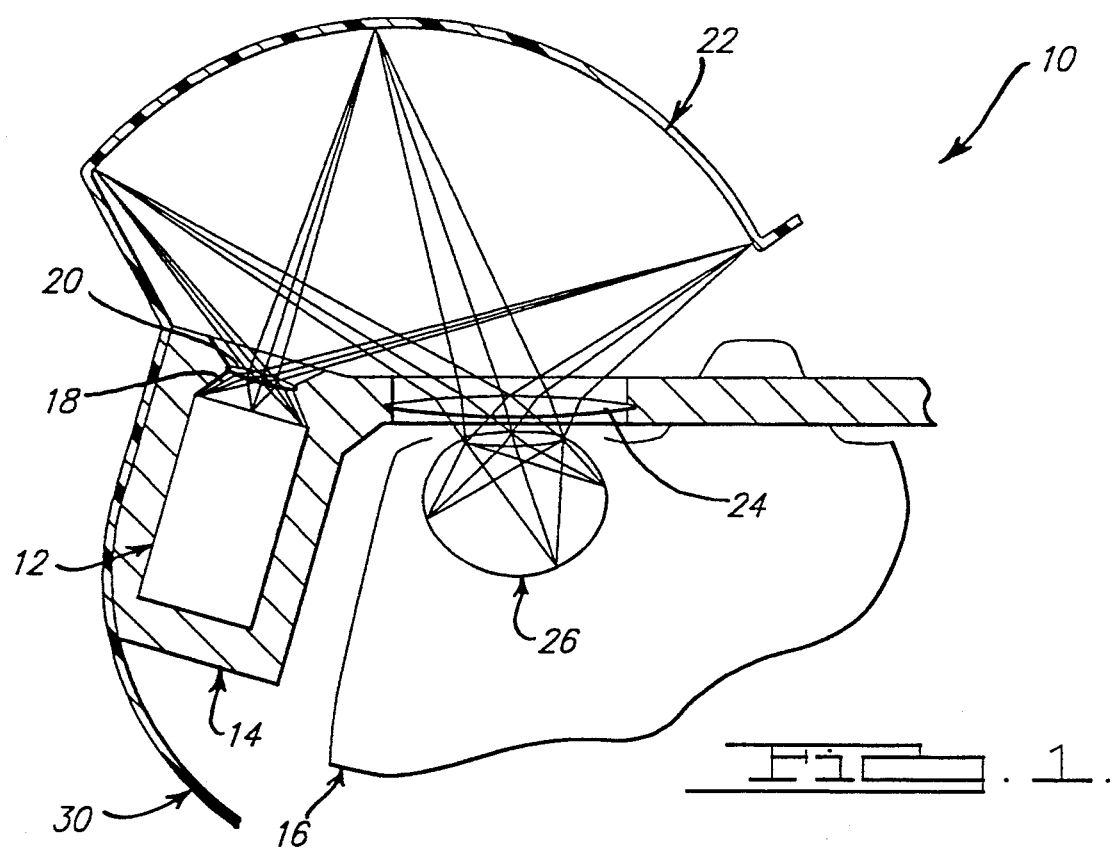
FIG. 1 schematically illustrates an optical system for a Head-Mounted Display (HMD) in accordance with the present invention.

Referring now to the FIG. 1, an HMD optical system 10 in accordance with the present invention utilizes an Electronic Display Device (ECC) 12 mounted in an HMD system chassis 14 proximate to the side of a viewer's head 16. The source image 18 formed by the EDD 12 is imaged by a lens 20 onto a concave projection screen 22. A common technique employed for projection of a source image known to one of ordinary skill in the art provides for scattering of the source image light, wherein projection screen 22 operates to re-image and display the scattered image 18. Projection screen 22 can further include reflective optical elements integrated with the display surface to enhance re-imaging of the scattered source image 18. Lens 24 then re-images the image projected at screen 22 to form a virtual image as viewed by the user's eye 26.

EDD 12 can be any display device or combination of devices which will form a source image 18, including, but not limited to a CRT, Liquid Crystal array, LED array, film slide, or an optically relayed image source. Lens 20 is any optical sub-system which will form an image on the projection screen 22 to fill the field of that screen as viewable by the eye 26 through lens 24. Similarly, lens 24 is any optical sub-system which provides an acceptable, large FOV virtual image to the eye from the intermediate image at screen 22.

The benefits of the invention are realized by a combination of synergistic characteristics. First, the concavity of the projection screen 22 naturally compensates for much of the field curvature and distortion produced by both lenses 20 and 24—reducing the complexity, cost and weight of these lenses. Second, the use of projection screen 22 makes the FOV relative to user's eye 26 entirely independent of the aperture size of lens 20. Thus, this aperture size can be small thereby reducing off-axis rays and achieving a reduction in associated aberrations, increased depth of focus and minimized weight of the lens. And because depth of focus increases, the alignment and shape of the screen 22 can be designed with relaxed tolerances. Third, the accommodation capacity of the eye also results in a relaxed alignment and shape requirement on the projection screen 22 which can therefore be formed of a thin, lightweight material serving as the body, or headgear structure 30, of the HMD and attached to the system chassis 14.

Figure 2:
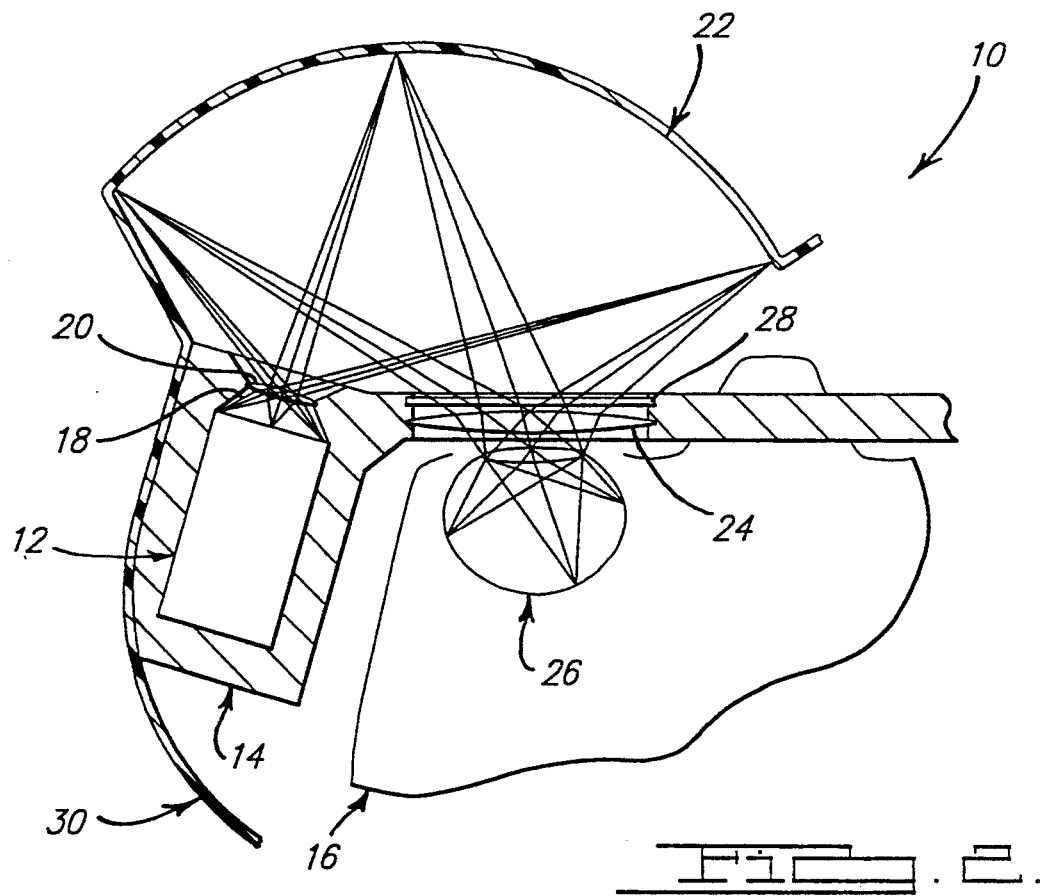
FIG. 2 schematically illustrates an optical system for an HMD in accordance with the present invention utilizing an optical spatial filter.

In accordance with another aspect of the present invention, additional benefits are realized by the use of an optional optical spatial filter 28 proximate lens 24 as shown in FIG. 2. While such filters have only recently been demonstrated to remove artificial image artifacts such as picture element and/or line structures from video projection systems, they have never been designed, employed or demonstrated to operate in an HMD. Such employment in the current invention not only improves the quality of the image by removing these structures, it also increases the depth of focus of the image formed by the combination of lens 24 and the eye 26. The increase in depth of focus provides a benefit not realized or exploited in current or prior applications of such filters. This result therefore further relaxes the aforementioned tolerances associated with screen 22, thereby further increasing the practicality of the described embodiment. However, both increased depth of focus and decreased artificial image artifacts are qualities desirable in any HMD system. The use of optical spatial filters in such systems therefore provides a benefit independent of the current embodiment.

The invention described herein therefore comprises simple, lightweight optics and a lightweight projection surface accommodated by the interior of the HMD body. It therefore generally comprises a lightweight, large FOV HMD which is inexpensive and practical to fabricate compared to prior HMD optical systems. Further, when used in conjunction with an optical spatial filter, the invention provides improved image quality by reducing artificial pixel and line structures. It is understood that modifications to the invention might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. An imaging system for a head-mounted display, said head-mounted display comprising a headgear structure to be worn on the head of a person, said imaging system comprising:

means for projecting a source image within the headgear structure;

an incurvate projection surface positioned within the headgear structure for displaying the projected source image; and a first lens proximate the person's eye for re-imaging the projected image displayed on said incurvate projection surface as a wide field virtual image, wherein said means for projecting a source image comprises a second lens having an aperture size sufficient to image the projected image onto the incurvate projection surface, said aperture size being independent of an exit pupil of said first lens.

2. The imaging system of claim 1 wherein said incurvate projection surface comprises an inner surface of said headgear structure.

3. The imaging system of claim 1 wherein said incurvate projection surface is integrally formed as part of the headgear structure.

4. An imaging system for a head-mounted display comprising:

means for projecting a source image;

a projection screen for displaying the projected source image;

means for re-imaging the projected image displayed by said projection screen as a virtual image for viewing by a person using the head-mounted display; and an optical spatial filter located proximate said re-imaging means for decreasing artificial image artifacts in the virtual image, and increasing the depth of focus of the virtual image.

5. An imaging system for a head-mounted display comprising:

means for projecting a source image;

means for displaying the projected source image as a virtual image for viewing by a person using the head-mounted display; and an optical spatial filter for decreasing artificial image artifacts in the virtual image, and for increasing the depth of focus of the virtual image.

6. The imaging system of claim 5 wherein said means for displaying the projected image source comprises a projection screen.

7. The imaging system of claim 6 wherein said head-mounted display comprises a headgear structure to be worn on the head of the viewer, and said projection screen is integrally formed as part of said headgear structure.

8. An imaging system for a head-mounted display comprising:

means for projecting a source image onto an image surface to form an intermediate image;

means for re-imaging the intermediate image as a virtual image for viewing by a person using the head-mounted display; and an optical spatial filter for removing unwanted image artifacts from the virtual image.

* * * * *